United States Patent [19]
Schulz

[11] Patent Number: 4,783,105
[45] Date of Patent: Nov. 8, 1988

[54] SNOW FLIPPER

[76] Inventor: Steven L. Schulz, 2628 Brinker Ave., Ogden, Utah 84401

[21] Appl. No.: 59,655

[22] Filed: Jun. 8, 1987

Related U.S. Application Data

[63] Continuation-in-part of Ser. No. 931,284, Nov. 17, 1986, abandoned.

[51] Int. Cl.$^4$ .............. A01B 1/02; E01H 5/02
[52] U.S. Cl. ..................... 294/54.5; 294/57
[58] Field of Search .......... 294/19.1, 49, 54.5, 294/55, 55.5, 57, 58; 15/143 R; 16/110 R, 111 R; 37/118 R, 122, 137, 265, 285; 81/177.6, 489

[56] References Cited

U.S. PATENT DOCUMENTS

| | | | |
|---|---|---|---|
| 229,741 | 7/1880 | Murphy | 294/49 |
| 501,383 | 7/1893 | Thomas | 15/143 R |
| 656,093 | 8/1900 | Caruthers | 294/49 |
| 3,804,451 | 4/1974 | Burke | 294/54.5 X |
| 4,149,744 | 4/1979 | Bonnes | 294/54.5 |
| 4,280,727 | 7/1981 | Germain | 294/54.5 |
| 4,655,494 | 4/1987 | Eads et al. | 294/49 |

FOREIGN PATENT DOCUMENTS 739105  9/1943  Fed. Rep. of Germany ........ 294/57

OTHER PUBLICATIONS

Ames Catalog Brochure, "Poly Snow and General Purpose Shovels", April, 1980.

Primary Examiner—Johnny D. Cherry
Attorney, Agent, or Firm—Henderson & Sturm

[57] ABSTRACT

An improved snow shovel construction (10) comprising a novel continuous diameter wooden handle unit (11) and a shovel blade unit (12); wherein, the blade unit (12) limits the volume and the weight carrying capacity due to its dimensioning; whereby, the handle unit (11) and the shovel blade unit (12) are capable of being "flexed" backwardly and "flipped" forwardly in the act of shoveling snow or slush (K).

2 Claims, 1 Drawing Sheet

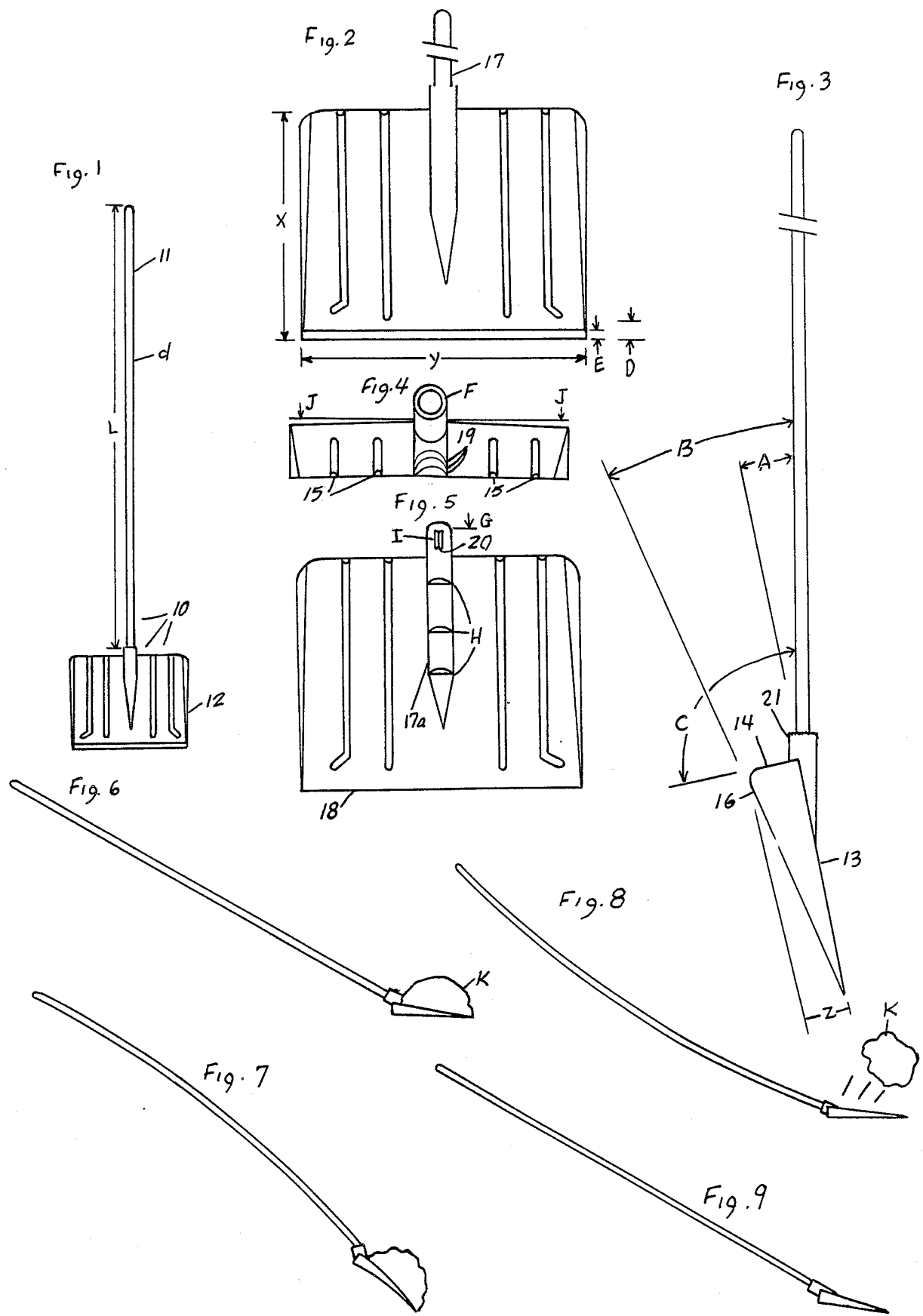

SNOW FLIPPER

BACKGROUND OF THE INVENTION

This application is a continuation-in-part application of my earlier patent application Ser. No. 931,284 filed on Nov. 17, 1986 and entitled SNOW FLIPPER, now abandoned.

TECHNICAL FIELD

The present invention relates generally to the field of snow shovel constructions.

It should not come as a surprise that the prior art is replete with myriad diverse snow shovel constructions, examples of which may be seen by reference to the following issued U.S. Pat. Nos. 3,369,835; 4,149,744; 1,898,234; and, 3,328,067.

What is also not surprising is the fact that virtually all of the prior art constructions are specifically designed to provide a rigid handle and blade of the snow shovel; and also, to provide strengthening or reinforcing elements for the blade edge or the blade per se and handle.

Given the fact that the rear and front edge of the typical snow shovel encounters a substantial amount of abuse and coupled with the fact that wet snow and/or slush is very heavy and requires a stiff blade element to off-set the weight of the accumulated material, in the normal mode of operation of such a device, it is logical that the development trend of snow shovels has proceeded in the direction in which it has gone (i.e. strong and light but stiff).

Obviously the prior art devices are more than adequate to perform their intented function, which is the removal of snow from a given surface; however, these prior art constructions have not given sufficient consideration to the dynamics involved in the act of shoveling snow considering how strenuous that activity can be under certain conditions.

Each year a large number of people suffer heart attacks as a direct consequence of over-exerting themselves while shoveling snow. Also, many suffer back and upper body pain from shoveling snow. Not only is this suffering and loss of life unfortunate, but best of all it is unnecessary, and, can be avoided once the traditional way of constructing a snow shovel has been abandoned, in favor of the teachings embodied in the present invention.

BRIEF SUMMARY OF THE INVENTION

The present invention comprises a shovel construction that at first glance is very distinguishable from what would have to be considered a typical or standard snow shovel construction.

Briefly stated, the theories and principles involved in the development of the shovel construction of this invention have constituted a total reversal from the traditional thinking regarding such constructions.

This new, unique and novel approach concentrates on limiting the volume and mass of snow that can be effectively supported by the snow shovel blade and handle; and, also requires that both the snow novel blade and handle have a great deal of flexibility, coupled with the strength and resiliency to remove a limited weight of snow or slush; wherein the resilient handle and blade return to their unflexed state assisting the user in propelling the accumulated snow or slush much easier than ever before.

Another object of the present invention is to minimize the amount of strenuous activity involving the users back and upper body; whereby they stand upright, without bending over, using their arms and hands mainly, while shoveling snow or slush; and, also to reduce the maximum amount of potential resistance that a user can possibly encounter while employing this new shovel construction.

BRIEF DESCRIPTION OF THE DRAWINGS

These advantages and novel features of the invention will become apparent from the detailed description of the best mode for carrying out the preferred embodiment of this invention which follows; particularly when considered in conjunction with the accompanying drawings; wherein:

FIG. 1 is a front elevation view of the new snow shovel construction;

FIG. 2 is an enlarged front elevation view of the snow shovel blade;

FIG. 3 is an enlarged side elevation view of the shovel blade and continuous diameter wooden handle;

FIG. 4 is an enlarged top view of the shovel blade without the handle;

FIG. 5 is an enlarged rear elevation view without handle;

FIG. 6 is a side view with a load of snow;

FIG. 7 is a side view with a load of snow showing the rearwardly "flexed" position of the handle and blade which shows the flexibility of the shovel while lifting snow or slush;

FIG. 8 is a side view showing the forwardly "flipped" position of the handle and blade which shows the flipping action in propelling the snow or slush forward; and, FIG. 9 is a side view showing the snow shovel returned to its original position.

BEST MODE FOR CARRYING OUT THE INVENTION

The improved snow shovel that forms the basis of the present invention can be seen by reference to FIG. 1 wherein the snow shovel is designated generally by the reference numeral (10). The snow shovel (10) comprises in general, a continuous diameter wooden handle unit (11) and a plastic shovel blade unit (12). These units will now be described in seriatim fashion.

As can best be seen by reference to FIG. 1, the wooden handle unit (11) comprises a continuous diameter handle having a length "L" and a diameter "d".

For the purposes of this invention, the value of "L" will be in the range between thirty inches and eighty-four inches (30" to 84") and the value of the diameter "d" will be between sixty-three hundredths of an inch to one and seventeen hundredths of an inch (0.63" to 1.17").

While these ranges cover a multitude of handle configurations, we shall explain their purpose: This snow shovel (10) was designed to allow its user to shovel snow standing in an upright position without having to bend over in-order to shovel the snow; thus, different heights of users would require different lengths "L" of handle units (11). There is a specific formula that matches a given handle (11) length "L" to a given handle (11) diameter "d" which produces the required flexing and flipping action for the resiliency of the handle unit (11). Another reason for the multitude of handle configurations is: In order for a longer handle (11) to pick-up the same shovel blade (12) full of snow on a smaller diameter "d" but shorter handle (11), the longer handle (11) must be stronger, that is, the diameter must be increased, as will be shown.

As can be seen by reference to Table 1 attached hereto, the diameter "d" of the wooden handle unit (11) increases proportionately with the length "L" of the handle unit (11).

TABLE 1

CONTINUOUS DIAMETER WOODEN HANDLE SCHEDULE
Handle length "L" in inches
Handle diameter "d" in one-hundredth inches

| Length | Diameter |
|---|---|
| 30 | .63 |
| 31 | .64 |
| 32 | .65 |
| 33 | .66 |
| 34 | .67 |
| 35 | .68 |
| 36 | .69 |
| 37 | .70 |
| 38 | .71 |
| 39 | .72 |
| 40 | .73 |
| 41 | .74 |
| 42 | .75 |
| 43 | .76 |
| 44 | .77 |
| 45 | .78 |
| 46 | .79 |
| 47 | .80 |
| 48 | .81 |
| 49 | .82 |
| 50 | .83 |
| 51 | .84 |
| 52 | .85 |
| 53 | .86 |
| 54 | .87 |
| 55 | .88 |
| 56 | .89 |
| 57 | .90 |
| 58 | .91 |
| 59 | .92 |
| 60 | .93 |
| 61 | .94 |
| 62 | .95 |
| 63 | .96 |
| 64 | .97 |
| 65 | .98 |
| 66 | .99 |
| 67 | 1.00 |
| 68 | 1.01 |
| 69 | 1.02 |
| 70 | 1.03 |
| 71 | 1.04 |
| 72 | 1.05 |
| 73 | 1.06 |
| 74 | 1.07 |
| 75 | 1.08 |
| 76 | 1.09 |
| 77 | 1.10 |
| 78 | 1.11 |
| 79 | 1.12 |
| 80 | 1.13 |
| 81 | 1.14 |
| 82 | 1.15 |
| 83 | 1.16 |
| 84 | 1.17 |

As can be appreciated by reference to the schedule, for every one inch increase in length "L", the handle (11) will increase a corresponding one-hundredth (0.01) of an inch in diameter "d". This uniform proportioning of the handle (11) length "L" to the handle (11) diameter "d" produces a handle unit (11) that will retain the required degree of flexibility and will not break the handle unit (11) at the longer lengths "L" when the shovel blade unit (12) is weighted down with an accumulated load of snow or slush. In fact the combined resiliency of both the handle unit (11) and the shovel blade unit (12) is the heart of this particular invention. The snow shovel handle (11) needs the proportionate length "L" and diameter "d" attached to the same shovel blade (12) size of the snow shovel (10) or it will not function as designed. Example: a Shovel blade (12) holds a restricted amount of snow. If the handle unit (11) length "L" was only 30 inches long and diameter "d" was 1.17 inches in width, there would be no "flexing" or "flipping" action to propel the snow or slush and the snow shovel would be in the same class as other snow shovel constructions, too stiff. Also, if the handle unit (11) length "L" was 84 inches long and the handle (11) diameter "d" was only 0.63 inches wide, the handle unit (11) would break under the weight of a full load of snow in the shovel blade (12). Thus, the longer the handle unit (11) length "L", the larger the handle unit (11) diameter "d" required to maintain the "flexing" and "flipping" action of the snow shovel unit (10).

The wood handle schedule will change depending on the type of wood used in the handle (11); the novelty of the handle unit (11) is the continuous diameter which produces the "flexing" and "flipping" action versus the stiffness used in the other art forms of snow shovels already in use.

Referring to FIGS. 2 through 5, it can be seen that the shovel blade unit (12) has a height "x", length "y" and depth "z". The shovel blade unit (12) has tapered side wall elements (13), an angled rear wall element (14), a plurality of rib elements (15) formed in the main blade bottom (16) and a handle socket element (17) formed in both the main blade bottom (16) and the angled rear wall element (14).

As can best be seen by reference to FIG. 3, the top edges of the side wall elements (13) are disposed at an angle of ten degrees (as indicated by A) to the longitudinal axis of the handle unit (11). In addition, the main blade bottom (16) is disposed at a twenty degree angle (as indicated by B) with respect to the longitudinal axis of the handle unit (11). Also, the angled rear wall element (14) is disposed at an one-hundred degree angle with respect to the longitudinal axis of the handle unit (11) (as indicated by C) in FIG. 3.

As shown in FIGS. 2 and 4, the preferred embodiment of this invention comprises four raised rib elements (15) formed in the main blade bottom (16) and terminating a distance of one inch (as indicated by D) from the front edge (18) of the main blade bottom (16) wiith the outside rib ends angled out toward the side wall element (13) and the front edge (18).

From the front edge (18) the main blade bottom (16) increases four-hundredths (0.04) of an inch in the direction of the angled rear wall element (14) for a distance of ½ inch (as indicated by E) in FIG. 2.

As can also be seen by reference to FIG. 4, the handle socket element (17) is provided with a recess opening (as indicated by F) that will receive the continuous diameter handle unit (11) up to a depth of two and one-half inches. The handle socket element (17) extends out past the angled rear wall element (14) one inch (as indicated by G) in FIG. 5.

In addition, the handle socket element (17) has an enlarged thickness relative to the remainder of the shovel blade unit (12) and further connects with and serves as the main reinforcing rib (17a) for the main shovel blade unit (12); the handle socket element (17) and the main reinforcing rib (17a) are disposed parallel to the longitudinal axis of the handle unit (11) and meet the main blade bottom (16) approximately two and three-fourths inches from the front edge (18). Appropriately, the handle socket element (17) and the main reinforcing rib (17a) are reinforced by three cross supports (19) formed approximately two inches apart (as indicated by H) in FIG. 5. The cross supports (19) are approximately thirteen-hundredths (0.13) inch in width with a slight taper formed with the widest point against the main reinforcing rib (17a).

The handle unit (11) is inserted into the shovel blade unit (12) by way of the handle socket element (17) and is connected with a metal staple (20) nailed through the handle socket element (17) into the handle unit (11) (as indicated by I) in FIG. 5 on a raised flat receiver section (21) which has a height of 0.07 inches.

Referring to FIG. 4, the shovel blade (12) is disposed on both sides of the handle socket element (17) and the main reinforcing rib (17a) at an angle of four degrees (as indicated by J).

As can be seen by reference to FIGS. 7 and 8, the continuous diameter handle (11) along with the plastic snow shovel blade (12) will be "flexed" backwardly as it encounters resistance from an accumulation of snow or slush (as indicated by K); and, when the handle unit (11) is lifted upwardly and forwardly, the resilient deformation of the snow shovel (10) will be overcome to "flex" and then "flip" the snow or slush outwardly.

It should also be appreciated that the dimensioning of FIGS. 2 and 3, have been provided to establish preferred ranges of values for the dimensions represented by the letters "x", "y", and "z".

As shown in FIG. 2, the width of the shovel blade unit (12) is designated as "y"; wherein, the preferred value of "y" ranges from eleven inches to thirteen inches.

As shown in FIG. 3, the depth of the side wall element (13) of the shovel blade unit (12) is designated as "z"; wherein, the preferred value of "z" ranges from one and one-half inch to two inches.

As shown in FIG. 2, the height of the shovel blade unit (12) is designated as "x"; wherein, the preferred value of "x" ranges from nine inches to eleven inches.

It should be noted that the preferred thickness of the resilient plastic from which the shovel blade unit (12) is fabricated ranges from 1/16 inch to 1/5 inch; and the preferred width of the rib elements (15) ranges from ⅜ inch to ⅝ inch.

By this point, it should be apparent that the snow shovel construction thus far described comprises a snow shovel (10) having a continuous diameter wooden handle unit (11) and a shovel blade unit (12) emphasizing the novelty and uniqueness of the "flexing" and "flipping" action of this invention.

It should further be emphasized that due to the limited carrying capacity of the shovel blade unit (12) only a limited volume of snow may be handled per shovel full; and, more importantly, only a limited accumulated weight of snow or slush can be effectively supported on the flexible handle unit (11) and shovel blade unit (12).

The aforementioned limitations represent distinct advantages over any known prior art constructions, in that the users will be prevented from over exerting themselves while shoveling due to the inherent constraints that have been incorporated into this new shovel construction.

Having thereby described the subject matter of this invention it should be obvious that many substitutions, modifications, and variations of the invention are possible in light of the above teachings. It is therefore to be understood that the invention as taught and described herein, is only to be limited to the extent of the breadth and scope of the appended claims.

I claim:

1. An improved flexible snow shovel construction comprising:

a resilient flexible snow shovel blade means comprising a main blade element having side walls and a rear wall, wherein the volume capacity of the snow shovel blade element is limited by the dimensions thereof, and the weight bearing capacity of the flexible snow shovel blade element is further restricted by the resilient material from which it is fabricated; and, a uniformly proportioned flexible wooden handle means comprising a flexible handle member having a length "L" to diameter "d" ratio wherein the minimum value of "L" equals thirty inches and the minimum value of "d" equals sixty-three hundredths of an inch; and, wherein for every inch above the minimum value of the length "L" the value of the diameter "d" will be increased by one hundredth of an inch; whereby the flexible nature of both the blade means and the handle means will cause a flexure along the combined length of the blade and handle means when the blade element is loaded with snow and wherein the unloading of the snow from the blade element will be accompanied by a flipping action as the said flexible blade and handle means are returned to their unflexed state.

2. An improved snow shovel construction as in claim 1 wherein the resilient material is plastic.

* * * * *